United States Patent [19]

Aileo

[11] 4,231,117
[45] Nov. 4, 1980

[54] HELMET ASSEMBLY FOR ACCURATELY POSITIONING VISUAL DISPLAY SYSTEM

[75] Inventor: Jackson A. Aileo, Carbondale, Pa.
[73] Assignee: Gentex Corporation, Carbondale, Pa.
[21] Appl. No.: 3,195
[22] Filed: Jan. 15, 1979
[51] Int. Cl.² .............................................. A42B 3/00
[52] U.S. Cl. ............................................. 2/6; 2/420; 2/422
[58] Field of Search .............. 2/6, 420, 418, 419, 2/422; 350/248, 298; 358/248, 249

[56] References Cited

U.S. PATENT DOCUMENTS

| | | | |
|---|---|---|---|
| 3,059,519 | 10/1962 | Stanton | 2/6 X |
| 3,205,303 | 9/1965 | Bradley | 2/6 X |
| 3,344,433 | 10/1967 | Stapenhill | 2/420 |
| 3,495,272 | 2/1970 | Tempelhof | 2/420 |
| 3,590,388 | 7/1971 | Holt | 2/420 |
| 3,729,744 | 5/1973 | Rappleyea | 2/420 |

Primary Examiner—Peter P. Nerbun
Attorney, Agent, or Firm—Shenier & O'Connor

[57] ABSTRACT

A helmet assembly which accurately positions a portable visual display unit carried by the helmet shell thereof in a predetermined position relative to the eye of the wearer. The outer shell and an inner helmet assembly adapted to fit relatively closely over the wearer's head each have portions overlying the wearer's forehead which are maintained in predetermined spaced relationship with each other by readily releasable adjustable fasteners.

9 Claims, 4 Drawing Figures

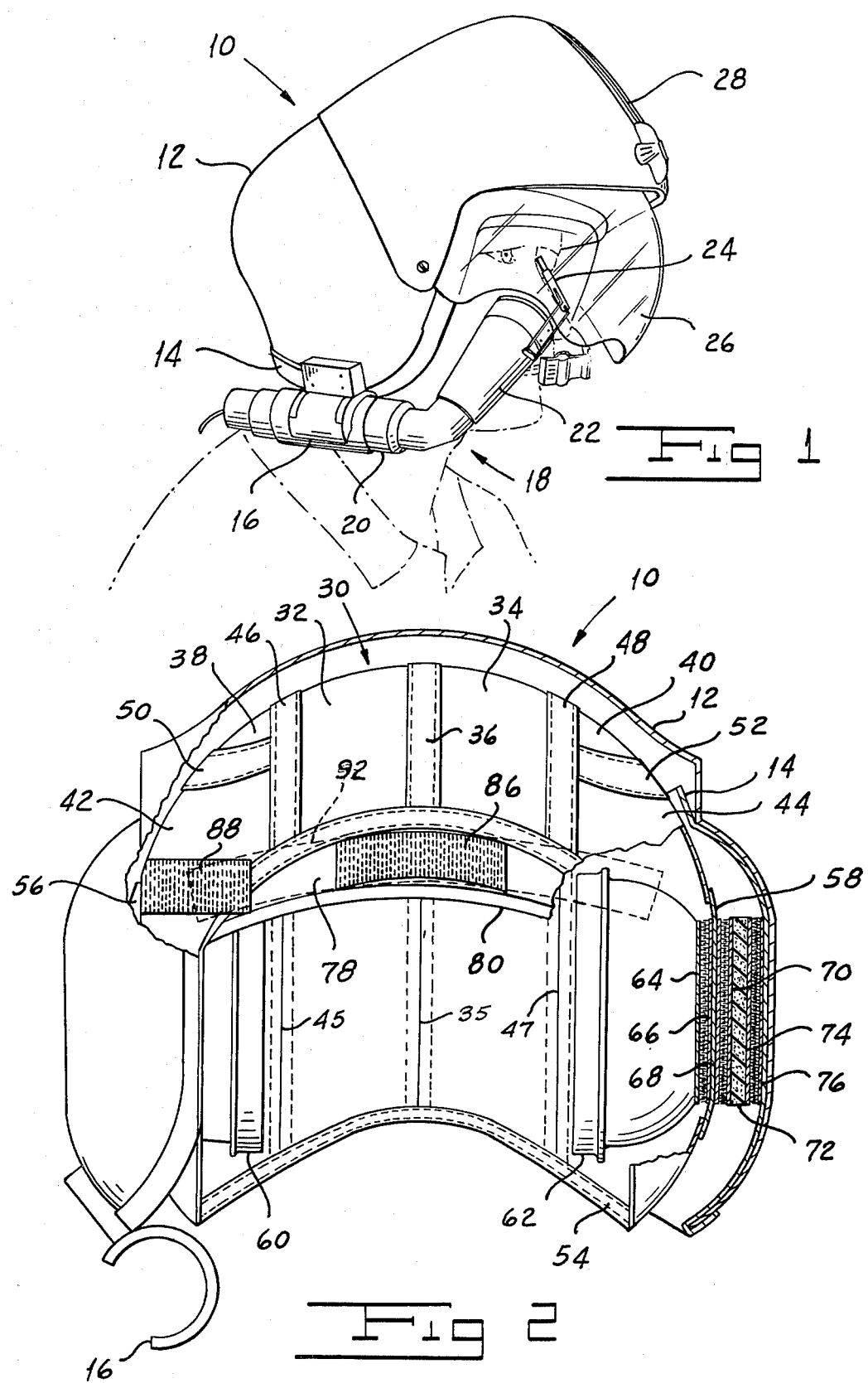
U.S. Patent  Nov. 4, 1980  Sheet 1 of 2  4,231,117

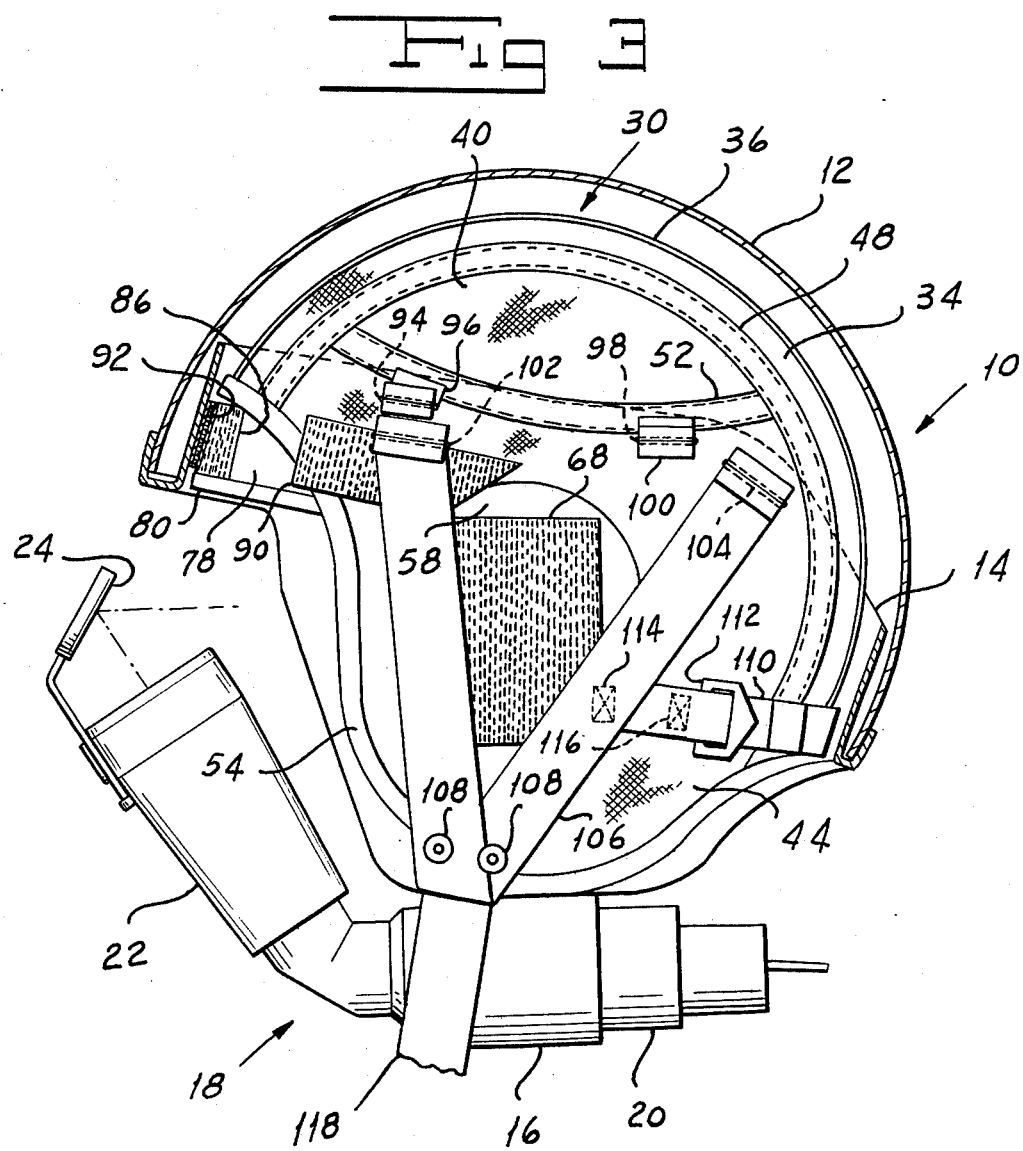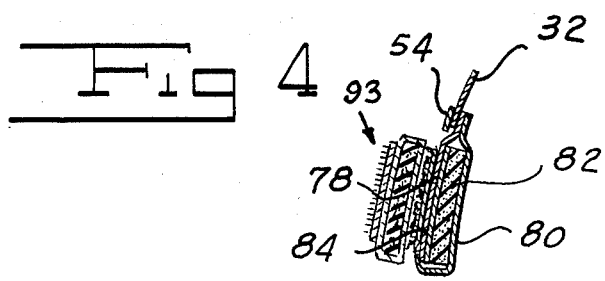

HELMET ASSEMBLY FOR ACCURATELY POSITIONING VISUAL DISPLAY SYSTEM

BACKGROUND OF THE INVENTION

This invention relates to an aircraft helmet assembly adapted to support a portable visual display unit in a predetermined position relative to the eye of the pilot.

Recently developed target display systems for pilots of helicopters or other aircraft include a cathode ray tube (CRT) which is mounted directly on the hard outer shell of the pilot's helmet at a position, for example, directly below the right ear. An optical system integral with the CRT and comprising one or more reflectors allows the pilot to view the image while looking generally ahead. Because of the fairly long path length of the optical system of the CRT display, it is extremely important that the system be maintained in an accurately aligned position relative to the eye of the pilot. In one specific system, for example, it is desirable to maintain the distance from the center of the eye to the edge of the helmet shell between $1\frac{7}{8}$ and $2\frac{1}{8}$ inches. Owing to variations in individual head size and configuration, however, it is difficult to maintain this tolerance with any degree of reliability. Further, the fore-and-aft wobbling of existing helmet shells, while small, is sufficient to cause misalignment even if the shell edge is initially properly aligned.

SUMMARY OF THE INVENTION

A principal object of my invention is to provide a helmet assembly which maintains an outer helmet shell carrying a visual display unit in a predetermined position relative to the eye of a wearer.

Another object of my invention is to provide a helmet assembly which maintains an outer helmet shell carrying a visual display unit in a predetermined position relative to the eye of the wearer while accommodating a wide range of head sizes.

Other and further objects of my invention will be apparent from the following description.

In general, my invention contemplates a helmet assembly for use with a portable visual display unit in which a rigid outer shell carrying a display unit and an inner helmet assembly adapted to fit relatively closely over the wearer's head each have portions overlying the forehead of the wearer. The outer helmet shell is secured to the inner helmet assembly with the overlying portions in predetermined spaced relationship to each other to position the visual display unit in a predetermined desired relationship relative to the eye of the wearer. Preferably, the overlying portions are releasably secured to each other by means of a strip of hook-type fastener elements carried by one of the overlying portions and a complementary strip of loop-type fastener elements carried by the other overlying portion.

Since the front edge of the helmet shell is urged into direct contact with the wearer's forehead, any necessary adjustment of fit due to variation in individual head size is made at the back of the helmet where it will have a minimal effect on sighting alignment. Further, since the front helmet shell edge does not float relative to the wearer's forehead as in previous designs, fore-and-aft wobbling is virtually eliminated.

BRIEF DESCRIPTION OF THE DRAWINGS

In the accompanying drawings to which reference is made in the instant specification and in which like reference characters are used to indicate like parts in the various views:

FIG. 1 is a three-quarter view of my helmet assembly and the visual display associated therewith.

FIG. 2 is a front elevation of an intermediate stage of construction of the assembly shown in FIG. 1, with parts shown in section. FIG. 3 is an enlarged left side elevation of an intermediate stage of construction of the assembly shown in FIG. 1, with parts shown in section.

FIG. 4 is an enlarged fragmentary section of the brow portion of the assembly shown in FIG. 1.

DETAILED DESCRIPTION OF THE PREFERRED EMBODIMENT

Referring now to the drawings, my helmet assembly, indicated generally by the reference numeral 10, includes a rigid outer shell 12 formed of any suitable ballistic material such as the material described in my prior U.S. Pat. No. 3,897,596. My helmet 10 also includes a suspension supporting frame 14 formed of any suitable synthetic resin and having a peripheral channel for receiving the lower edge of the outer shell 12. Outer shell 12 carries a clamp 16 on the right side below the ear of the wearer for supporting a cathode ray tube display indicated generally by the reference numeral 18. Display 18 includes a first barrel portion 20 extending generally fore and aft and housing the cathode ray tube (not shown) and an integral second barrel portion 22 extending upwardly from the portion 20 toward the wearer's right eye. A mirror (not shown) at the front end of portion 20 reflects an image of the cathode ray tube face along the second portion 22 to an adjustable outside reflector 24, which directs the image to the eye of the wearer. The complete helmet assembly 10 includes a visor 26 movable between a lowered position in front of the wearer's face as shown and a raised position behind a visor cover 28.

The inner subassembly of the helmet 10, indicated generally by the reference numeral 30, fits relatively closely over the wearer's head and provides a support for the outer shell 12 and structures associated therewith. As particularly shown in FIGS. 2 and 3, the inner subassembly of the helmet 10 includes a pair of central panels 32 and 34, a pair of side panels 42 and 44 and a pair of segments 38 and 40 respectively disposed between the middle portions of the side panels and the middle portions of the adjacent central panels. The central panels 32, 34 and the segments 38, 40 are formed of a flexible and more or less yieldable or elastic netting, such as nylon mesh, while the side panels 42 and 44 may be formed of a suitably closely woven, substantially inelastic fabric. The two central panels 32 and 34 extend in side-by-side relation from the transversely running portion of an edging 54 near the front of the helmet over the crown of the wearer's head to the rear of the helmet. A tape 36 of inelastic woven fabric is stitched over a seam 35 which extends along the fore-and-aft center line of the helmet.

The panel 32 is joined to the segment 38 and to the forward and rearward portions of the side panel 42 along a single continuous for-and-aft seam 45 which is covered externally by a tape 46 similar to the tape 36. The segment 38 is joined to the side panel 42 along a seam (not shown) which is likewise covered by a fabric tape 50. On the left-hand side of the helmet, the central panel 34, side panel 44 and segment 40 are joined in the same manner as the corresponding elements on the right-hand side of the helmet described above by seam 47 and tapes 48 and 52.

Edging tape 54 extends generally around the periphery of the helmet, being stitched to the forward edges of panels 32 and 34, the forward, lower and rear edges of panel 42, the rear edges of panels 32 and 34, and the rear, lower and forward edges of panel 44. The front edges of panels 32, 34 have a continuous arcuate contour so that the tape 54 curves somewhat above the wearer's forehead toward the crown of the head.

Side panels 42 and 44 carry respective oval-shaped fabric portions 56 and 58 which in turn support respective right and left earcup assemblies 60 and 62. More particularly, each of the earcup assemblies 60 and 62 carries a strip of hook-type fasteners such as sold by American Velcro Inc. under the trademark Velcro. Strip 64 permits a releasable attachment of the assembly 60 or 62 to a strip 66 of complementary loop-type fasteners carried by the inner surface of portion 56 or 58. Each of the fabric portions 56 and 58 in turn carries on its outer surface a strip 68 of hook-type fastener elements to permit releasable attachment of the portion 56 or 58 either directly to a strip 76 of loop-type fastener elements carried by the suspension frame 14 or to the frame through a foam pad 72 having a strip 70 of loop-type fastener elements on its inner surface and a strip 74 of hook-type fastener elements on its outer surface.

The helmet inner subassembly 30 also comprises a crescent-shaped fabric brow portion 78 overlying the wearer's forehead and extending forwardly and downwardly of tape 54 between right and left side panels 42 and 44. A leather lining 80 stitched along the inner surface of the brow portion 78 serves as a sweatband for the brow portion 78.

Brow portion 78 and leather lining 80 form a laterally extending pocket in which a strip 82 of polyurethane foam is placed to provide cushioning and in which a plastic strip 84 is inserted to provide a desired amount of stiffness. I releasably secure brow portion 78 to the suspension frame 14 by attaching a strip 86 of hook-type fastener materials to the outer surface of portion 78 and in addition secure similar strips 88 and 90 of hook-type fastener material to respective side panels 42 and 44 generally in line with the center strip 86. Strips 86, 88 and 90 releasably engage a strip 92 of loop-type fastener material secured to the inner surface of the suspension frame 14 along the brow portion thereof in registry with strips 86, 88 and 90. It is to be emphasized that this securing of the brow portion to the suspension frame results in the accurate positioning of the assembly 18 relative to the wearer's eye. If additional spacing between the front edge of shell 12 and the wearer's forehead is necessary for proper positioning of the assembly 18 relative to the eye of the wearer, one or more intermediary pads 93 similar to pad 72 may be sandwiched between strip 78 and strips 86, 88 and 90.

I form elongated slots 94 and 98 at spaced locations around the upper periphery of the suspension frame 14. Respective tabs 96 and 100 extend from stops formed on the tabs outside frame 14 through slots 94 and 98 to inner ends which I secure to the inner assembly 30 in the region of the tapes 50 and 52. My helmet assembly includes left and right-hand V-shaped chin strap portions, only one of which will be described in detail. The legs of a first V-shaped chin strap portion extend outwardly through another pair of slots 102 and 104 at spaced locations around the upper periphery of suspension frame 14 on one side thereof to retaining enlargements stitched or otherwise formed in the ends of the legs. A rear strap 110 adjustable in length by means of a buckle 112 extends around the rear of the inner assembly 30 along the nape portion thereof and is attached to an intermediate portion of the rear leg of each of the chin strap portions 106 by means of stitching 114. I secure the rear strap 110 to each of the side panels 42 and 44 just behind each of the respective chin strap portions 106 by means of stitching 116. Snap elements 108 provided at the bottom of the left chin strap portion 106 releasably engage mating snap elements (not shown) at the end of a crosspiece 118 carried by the right chin strap portion to secure the helmet assembly 10 to the head of the wearer.

It will readily be appreciated that the salient feature of my invention is the accurate positioning of the optical assembly relative to the wearer's eye. That is, I position the optical assembly which is carried by the outer shell 12 by releasably and adjustably securing the front of the inner subassembly 30 which closely fits the wearer's head to the front of the frame 14 which carries the outer shell. It will be apparent that with the upper front portion of the inner assembly 30 secured to the shell 12 there will be a space between the back of the assembly 30 and the back of the frame 14. If it is found to be necessary or desirable, this space can be filled with one or more detachable pads (not shown) to fill the space. It will readily be appreciated that this is done only after the front upper portion of assembly 30 has been secured to the shell accurately to position the eye of the particular wearer with respect to the optical assembly 18.

It will be seen that I have accomplished the objects of my invention. I have provided a helmet assembly which maintains an outer helmet shell carrying a visual display unit in a predetermined position relative to the eye of a wearer, while at the same time accommodating a range of head sizes.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A helmet assembly for use with a portable visual display unit including in combination a rigid outer shell, an inner subassembly adapted to fit relatively closely over the wearer's head, said outer shell and inner subassembly having portions overlying the forehead of the wearer, means for mounting said display unit on said outer shell, means for readily releasably securing said outer shell to said inner subassembly with said portions in predetermined spaced relationship to each other to position said visual display unit in a predetermined desired relationship relative to the eye of the wearer, a pad adapted to be inserted between said overlying portions, and means for readily releasably securing said pad between said overlying portions.

2. A helmet assembly for use with a portable visual display unit including in combination a rigid outer shell, an inner subassembly adapted to fit relatively closely over the wearer's head, said outer shell and inner subassembly having portions overlying the forehead of the wearer, said inner subassembly portion comprising a relatively resilient layer of padding, means for mounting said display unit on said outer shell, and means for adjustably securing said outer shell to said inner subassembly with said portions in predetermined spaced relationship to each other to position said visual display unit in a predetermined desired relationship relative to the eye of the wearer.

3. A helmet assembly for use with a portable visual display unit including in combination a rigid outer shell, an inner subassembly adapted to fit relatively closely over the wearer's head, said outer shell and inner subassembly having portions overlying the forehead of the wearer, means for mounting said display unit on said outer shell, and means for adjustably and readily releasably securing said outer shell to said inner subassembly with said portions in predetermined spaced relationship to each other to position said visual display unit in a predetermined desired relationship relative to the eye of the wearer.

4. A helmet assembly for use with a portable visuaL display unit including in combination a rigid outer shell, an inner subassembly adapted to fit relatively closely over the wearer's head, said outer shell and inner subassembly having portions overlying the forehead of the wearer, means for mounting said display unit on said outer shell, and means for readily adjustably securing said outer shell to said inner subassembly with said portions in predetermined spaced relationship to each other to position said visual display unit in a predetermined desired relationship relative to the eye of the wearer.

5. A helmet assembly for use with a portable visual display unit including in combination a rigid outer shell, an inner subassembly adapted to fit relatively closely over the wearer's head, said outer shell and inner subassembly having portions overlying the forehead of the wearer, means for mounting said display unit on said outer shell, and means for adjustably securing said outer shell to said inner subassembly with said portions in predetermined spaced relationship to each other to position said visual display unit in a predetermined desired relationship relative to the eye of the wearer.

6. A helmet assembly for use with a portable visual display unit including in combination a rigid outer shell, an inner subassembly adapted to fit relatively closely over the wearer's head, said outer shell and inner subassembly having portions overlying the forehead of the wearer, means for mounting said display unit on said outer shell, and means for adjustably securing said outer shell to said inner subassembly with said portions in predetermined spaced relationship to each other to position said visual display unit in a predetermined desired relationship relative to the eye of the wearer.

7. A helmet assembly for use with a portable visual display unit including in combination a rigid outer shell, an inner subassembly adapted to fit relatively closely over the wearer's head, said outer shell and said inner subassembly having portions overlying the forehead of the wearer, means for mounting said display unit on said outer shell, and means for adjustably securing said outer shell to said inner subassembly along said portions to position said visual display unit in a predetermined desired relationship relative to the eye of the wearer.

8. A helmet assembly for use with a portable visual display unit including in combination a rigid outer shell, a flexible inner subassembly adapted to fit relatively closely over the wearer's head, said outer shell and said inner subassembly having portions overlying the forehead of the wearer, means for mounting said display unit on said outer shell, and means for adjustably securing said outer shell to said inner subassembly along said portions to position said visual display unit in a predetermined desired relationship relative to the eye of the wearer.

9. A helmet assembly for use with a portable visual display unit including in combination a rigid outer shell, an inner subassembly adapted to fit relatively closely over the wearer's head, said outer shell and said inner subassembly having portions overlying the forehead of the wearer, means for mounting said display unit on said outer shell, means for adjustably securing said outer shell to said inner subassembly along said portions, and means for securing said outer shell to said inner subassembly along at least one other pair of adjacent portions to position said visual display unit in a predetermined desired relationship relative to the eye of the wearer.

* * * * *